(12) United States Patent
Whalen et al.

(10) Patent No.: US 11,634,270 B2
(45) Date of Patent: Apr. 25, 2023

(54) UTILITY BOX WITH ANGLED FLOOR

(71) Applicant: Plano Molding Company, LLC, Plano, IL (US)

(72) Inventors: John Whalen, Sheridan, IL (US); Ryan Kleckner, St. Charles, IL (US)

(73) Assignee: Plano Molding Company, LLC, Plano, TX (US)

( * ) Notice: Subject to any disclaimer, the term of this patent is extended or adjusted under 35 U.S.C. 154(b) by 547 days.

(21) Appl. No.: 15/620,334

(22) Filed: Jun. 12, 2017

(65) Prior Publication Data

US 2017/0362017 A1 Dec. 21, 2017

Related U.S. Application Data

(60) Provisional application No. 62/350,862, filed on Jun. 16, 2016.

(51) Int. Cl.
| | | |
|---|---|---|
| B65D 85/00 | (2006.01) |
| B65D 85/20 | (2006.01) |
| A45C 13/00 | (2006.01) |
| B25H 3/02 | (2006.01) |
| A01K 97/06 | (2006.01) |
| B25H 3/00 | (2006.01) |

(52) U.S. Cl.
CPC ............ B65D 85/20 (2013.01); A01K 97/06 (2013.01); A45C 13/00 (2013.01); B25H 3/02 (2013.01); B25H 3/00 (2013.01); B65D 85/00 (2013.01)

(58) Field of Classification Search
CPC .......... A01K 97/06; B25H 3/02; B25H 3/021; A45C 13/00; B65D 85/20; B65D 25/10; B65D 25/101; B65D 25/105

USPC ............ 43/57.1, 54.1; 206/372, 373, 315.11
See application file for complete search history.

(56) References Cited

U.S. PATENT DOCUMENTS

| | | | | |
|---|---|---|---|---|
| 2,595,051 A | * | 4/1952 | Bryant | A01K 97/06 43/57.1 |
| 2,690,578 A | * | 10/1954 | Burks | A47L 23/16 220/553 |
| 3,507,071 A | * | 4/1970 | Bryson | A01K 97/06 43/57.1 |
| 4,073,085 A | * | 2/1978 | Stremeckus | A01K 97/06 43/54.1 |
| 4,198,777 A | * | 4/1980 | Cruzan | A01K 97/06 43/57.1 |
| 4,842,136 A | * | 6/1989 | Nakazato | G03F 1/66 16/48.5 |

(Continued)

FOREIGN PATENT DOCUMENTS

| | | |
|---|---|---|
| CN | 200987328 Y | 12/2007 |
| EP | 1541067 A1 | 6/2005 |
| JP | 11-169043 A | 6/1999 |

OTHER PUBLICATIONS

Patent Cooperation Treaty International Searching Authority, Written Opinion and International Search Report, Application No. PCT/US2017/037204, dated Sep. 14, 2016.

*Primary Examiner* — Steven A. Reynolds
(74) *Attorney, Agent, or Firm* — Husch Blackwell LLP

(57) ABSTRACT

Provided is a utility box, which includes a first compartment. The first compartment includes a first angled floor and a first holding unit configured to hold an article in the first compartment. The utility box also includes a first lid that covers at least the first compartment.

17 Claims, 6 Drawing Sheets

(56) References Cited

U.S. PATENT DOCUMENTS

| | | | |
|---|---|---|---|
| 5,392,557 A * | 2/1995 | Harmon | A01K 97/06 206/315.11 |
| 5,501,355 A * | 3/1996 | Elzenbeck | A01K 97/06 206/315.11 |
| 5,526,927 A | 6/1996 | McLemore | |
| 5,606,820 A * | 3/1997 | Suddeth | A01K 97/06 206/315.11 |
| 5,782,356 A * | 7/1998 | Hugg | B65D 25/04 206/454 |
| 6,527,113 B2 * | 3/2003 | Blake | A01K 97/06 206/315.11 |
| 6,681,993 B1 * | 1/2004 | Nunnink | G06K 7/10693 235/462.01 |
| 7,104,420 B2 * | 9/2006 | Maffei | A61F 15/001 206/440 |
| 7,124,883 B1 * | 10/2006 | Thomas | B65D 43/162 206/256 |
| 7,168,204 B2 * | 1/2007 | Wieringa | A01K 97/06 206/315.11 |
| 7,434,410 B2 * | 10/2008 | Ford | F25D 3/08 62/371 |
| 8,468,740 B1 * | 6/2013 | Ryckman | A01K 97/06 206/315.11 |
| 8,607,499 B2 * | 12/2013 | Hoover | A01K 97/06 43/54.1 |
| 9,883,665 B2 * | 2/2018 | Heaton | A01K 97/06 |
| 2009/0044442 A1 | 2/2009 | Ryckman | |
| 2015/0373963 A1 * | 12/2015 | Harrell | A01K 97/05 43/54.1 |
| 2016/0015017 A1 * | 1/2016 | Heaton | A01K 97/06 43/54.1 |

\* cited by examiner

UTILITY BOX WITH ANGLED FLOOR

CROSS REFERENCE TO PRIOR APPLICATIONS

This application claims priority to and the benefit thereof from U.S. Provisional Patent Application No. 62/350,862, filed Jun. 16, 2016, titled "ANGLED FLOOR UTILITY BOX," the entirety of which is hereby incorporated herein by reference.

FIELD OF THE DISCLOSURE

The instant disclosure relates generally to a utility box that may be used to store and organize items, and more particularly, it relates to a utility box that can store items more efficiently.

BACKGROUND OF THE DISCLOSURE

Many different types of fishing storages are available, including, for example, soft bags, to store different varieties of plastic bagged artificial baits. The storages/soft bags are not transparent and need to be fully opened before the user can locate a particular bait he or she is looking for. Also, these fishing storages/bags provide limited sorting/indexing capabilities. Therefore, even if all the items and boxes are sorted and placed in the fishing storage/bag, the users very often end up needing to take out all the items and boxes in the storage/bag and visually inspect them one by one until he or she locates a desired item or box.

Accordingly, there exists a need for a utility storage that allows a user to organize and retain various articles in easy-to-inspect locations so that the user can quickly index through the articles stored therein.

SUMMARY OF THE DISCLOSURE

One aspect of the present disclosure provides a utility box, which includes a first compartment including a first angled floor and a first holding unit configured to hold an article in the first compartment. The utility box also includes a first lid that covers at least the first compartment.

The first holding unit may be arranged on the first angled floor. The first holding unit may be integral to the first angled floor. The first holding unit may be arranged on a higher portion of the first angled floor.

The utility box may further include a second compartment located laterally adjacent to the first compartment. The second compartment may include a second angled floor. The first and second angled floors may be angled in the same direction. The first and second angled floors may be angled in different directions. The first lid may cover both the first and second compartments. The second compartment may further include a second holding unit formed on the second angled floor.

According to another aspect of the disclosure, a utility box includes a first compartment facing a first direction; a second compartment located under the first compartment and facing a second direction; and an angled floor located between the first and second compartments.

The utility box may further include a first lid that covers the first compartment and a second lid that covers the second compartment.

The utility box may further include a first holding unit configured to hold an article in the first compartment and a second holding unit configured to hold another article in the second compartment. The first and second holding units may be arranged on the angled floor. The first and second holding units may be arranged on higher and lower portions of the angled floor, respectively.

According to yet another aspect of the disclosure, a storage compartment includes a sidewall structure, an angled floor surrounded by the sidewall structure, and a holding unit configured to hold an article in the storage compartment.

The storage compartment may further include a lid pivotally connected to the sidewall structure.

The holding unit may be arranged on the angled floor. The holding unit may be arranged on an upper portion of the angled floor. The holding unit may include a clip.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF THE DISCLOSURE

Figure 1:
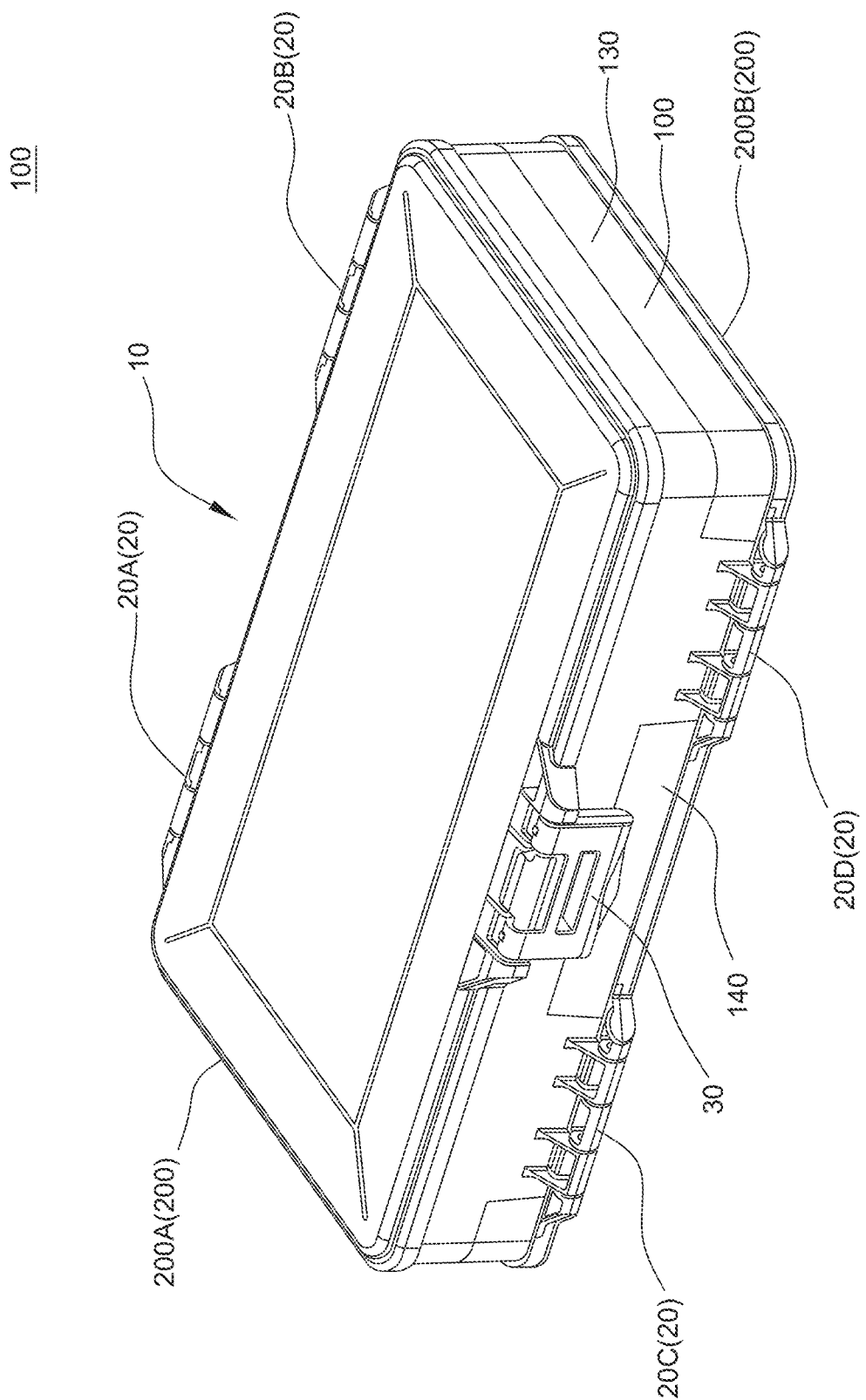
FIG. 1 shows a perspective view of an example of a utility box constructed according to the principles of the disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows a perspective view of a utility box (or bag) 10, constructed according to the principles of the invention. The utility box 10 may include a main body 100 and one or more lids 200, for example, first and second lids 200A, 200B. FIG. 1 shows the first and second lids 200A, 200B in a closed position.

Figure 2:
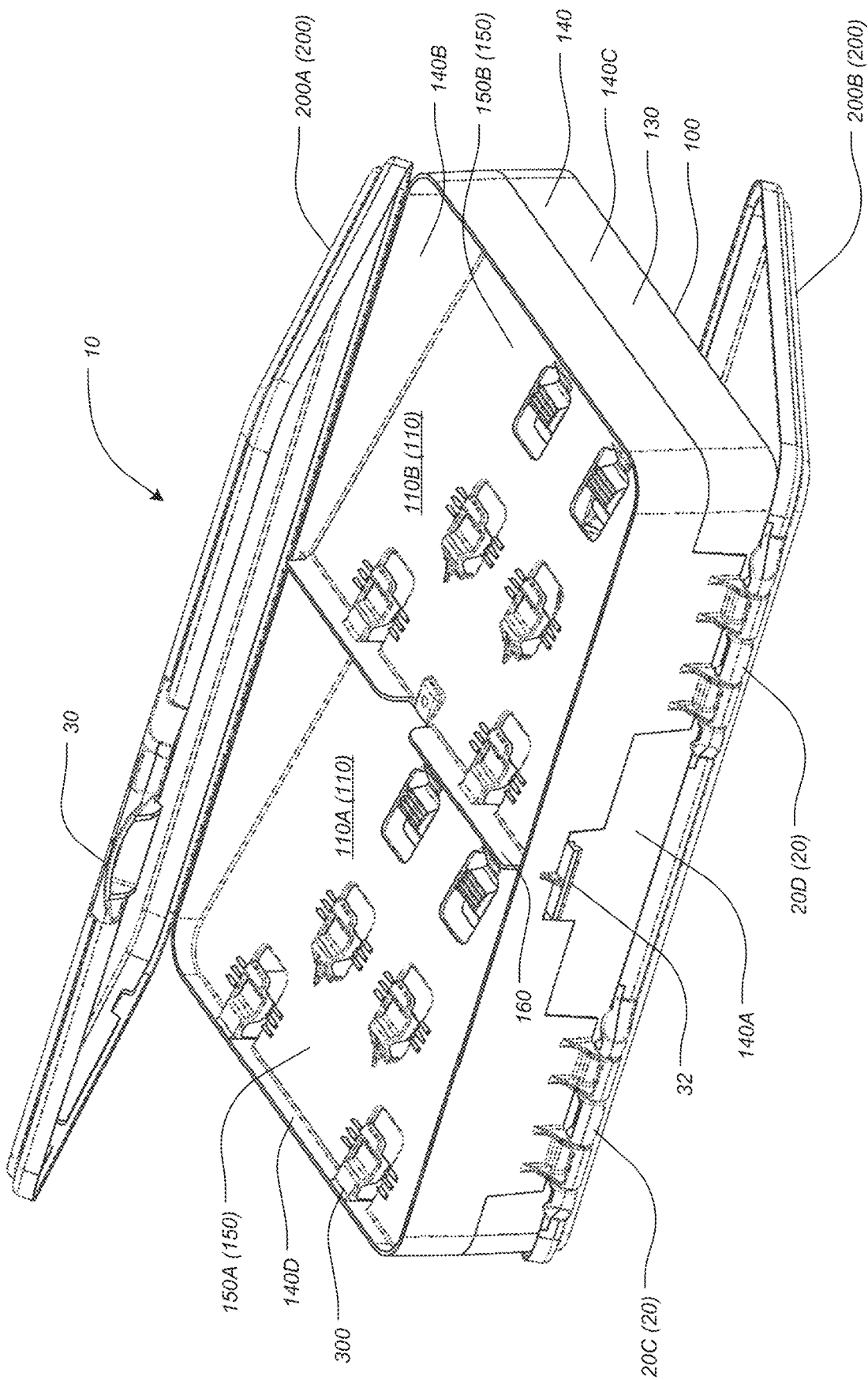
FIG. 2 shows the utility box in FIG. 1 with first and second lids in an open position.

FIG. 2 shows the utility box 10 with the first and second lids 200A, 200B in an open position. The main body 100 and the lids 200 may be transparent or translucent such that articles 50 (shown in FIG. 4) stored in different compartments 110 may be seen without opening the lid(s) 200.

Referring to FIGS. 1 and 2, the main body 100 may have one or more compartments 110. For example, as seen in FIG. 2, the main body 100 may have first and second compartments 110A, 110B that are laterally adjacent to each other and facing upwardly. The main body 100 may have more or less compartments 110. For example, the main body 100 may have one or more additional compartments, such as, for example, third and fourth compartments 110C, 110D (shown in FIG. 3), which may be located below the compartments 110A, 110B and facing downwardly.

The main body 110 may include a wall structure 130 that defines the one or more compartments 110. The wall structure 130 may include, for example, one or more sidewalls 140, one or more floors 150, and one or more divider walls 160. The sidewalls 140 may laterally surround the one or more compartments 110. The sidewalls 140 may have a rectangular shape. Other shapes are also contemplated, including, for example, square, triangular, pentagonal, hexagonal, circular, elliptical, or trapezoid shape. The sidewalls 140 may include two longer sidewalls 140A, 140B facing each other and two shorter sidewalls 140C, 140D facing each other. The corners of the sidewalls 140 may be rounded.

As seen in FIG. 2, the wall structure 130 may have a single divider wall 160 that extends between the two longer sidewalls 140A, 140B, which creates two compartments 110A, 110B, facing upwardly. The divider wall 160 may also create two compartments 110C, 110D facing downwardly (shown in FIG. 3) below the compartments 110A, 110B.

More than one divider wall 160 may be formed to create more compartments 110. For example, the wall structure 130 may have an additional divider wall (not shown) that extends between the two shorter sidewalls 140C, 140D and traverses the existing divider wall 160. Each compartment 110 may have the same shape or size. Alternatively, some or all of the compartments 110 may have different shapes and sizes, which may be achieved by, for example, changing locations of the divider wall 160 and/or the floors 150.

The first and second compartments 110A, 110B may be covered by the first lid 200A. The third and fourth compartments 110C, 100D facing downward (shown in FIG. 3) may be covered by the second lid 200B. More than one lid 200 may be used to cover the compartments 110A, 110B. Each compartment 110 may be covered by one or more lids 200. The compartments 110 may be formed to face the same or different directions.

The lids 200 may be removably attachable to the main body 100. For example, the main body 100 and/or the lids 200 may be flexible such that the lids 200 may be attached to the main body 100 by snap-fit or the like. Alternatively, the lids 200 may be removably attached to the main body 100 via one or more fasteners (not shown), such as, for example, a button, a clip, a hook and loop fastener, a zipper, a hinge, or the like.

The lid(s) 200 may be movably connected to the main body 100. For example, as seen in FIGS. 1 and 2, the utility box 10 may include one or more hinges 20 that pivotally connect the lids 200 to the main body 100. The first lid 200A may be pivotally connected to the main body 100 via a pair of hinges 20A and 20B located at an upper portion of the sidewall 140B (shown in FIG. 2). The second lid 200B may be pivotally connected to the main body 100 via a pair of hinges 20C, 20D located at a lower portion of the sidewall 140A. The hinges 20 may be located at different locations. For example, the hinges 20 may be formed on upper and lower portions of the same sidewall 140, for example, the sidewall 140A or 140B. The hinges 20 may be located at one or both of the shorter sidewalls 140C, 140D. The hinges 20 may be produced independently and attached to the main body 100 and the lids 200. Alternatively, the hinges 20 may be formed integral to the main body 100 and/or the lids 200. For example, the main body 100 and the lids 200 may be molded simultaneously with the hinges 20 formed therebetween.

The utility box 10 may include one or more fasteners to keep the one or more lids 200 in the closed position. For example, as seen in FIG. 1, the utility box 10 may include a latch 30 that keeps the first lid 200A in the closed position. The latch 30 may be connected to the first lid 200A and configured to engage a tab 32 formed on the first sidewall 140A when a force is applied to push the latch 30 towards the first sidewall 140A. When a force is applied to pull the latch 30 away from the first sidewall 140A, the latch 30 may be separated from the tab 32, and the first lid 200A may rotate with respect to the hinges 20A, 20B. The utility box 10 may have one or more additional fasteners (not shown) to keep the second lid 200B in the closed position. The latch 30 may be produced independently and attached to the lid 200. Alternatively, the lid 200 may be produced to include the latch 30 by, for example, molding the lid 200 and latch 30 as a single piece. Alternatively or additionally, the utility box 10 may include other fasteners, such as, for example, a buckle, a button, a clip, a hook-and-loop fastener, a pin, a snap fastener, a zipper, and/or the like, to keep the lids 200 in the closed position.

Figure 3:
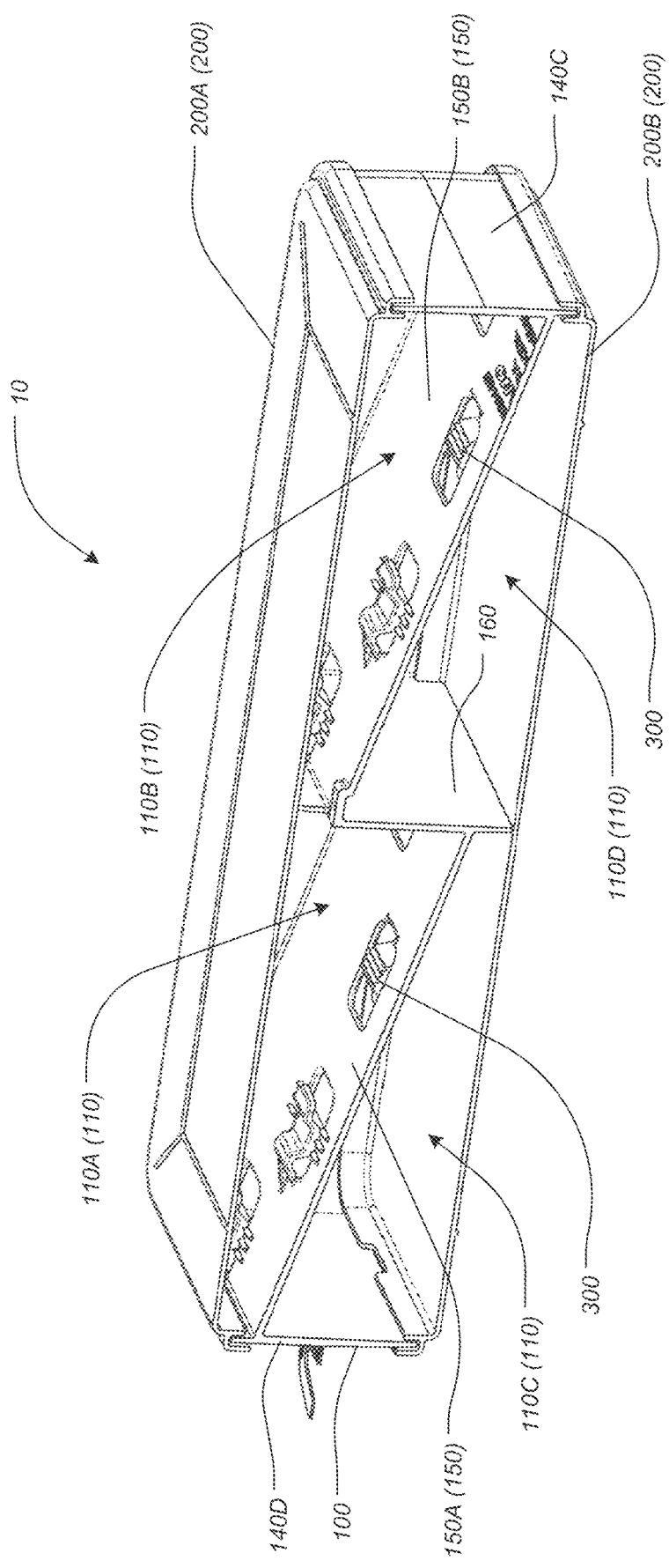
FIG. 3 shows a perspective cross-section view of the utility box in FIG. 1.

FIG. 3 shows a perspective cross-section cut of the utility box 10 in FIG. 1.

Figure 4:
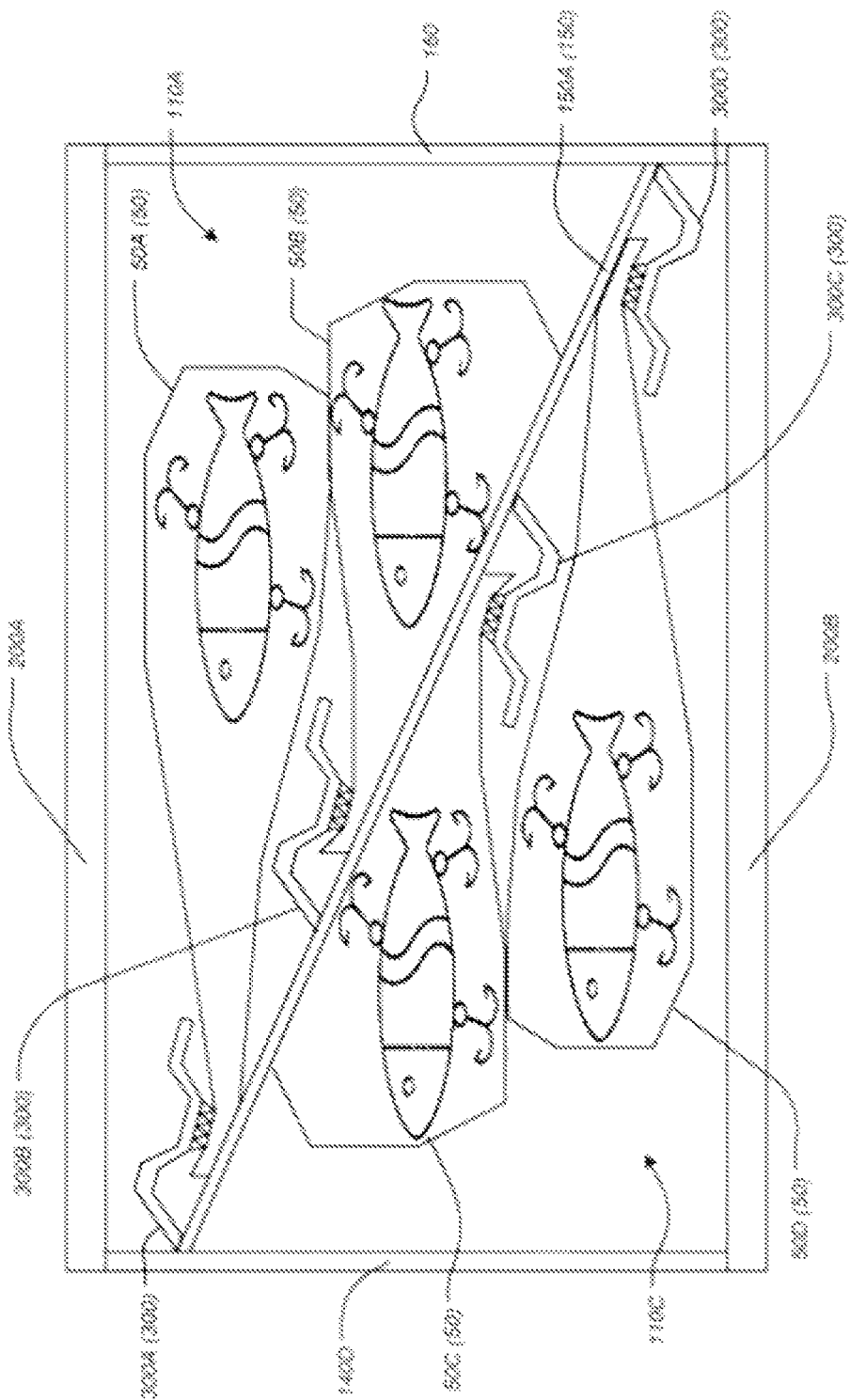
FIG. 4 shows a side cross-section view of two vertically adjoining compartments of the utility box in FIG. 1.

FIG. 4 shows a side cross-section view of two vertically adjoining compartments 110A, 110C.

Figure 5:
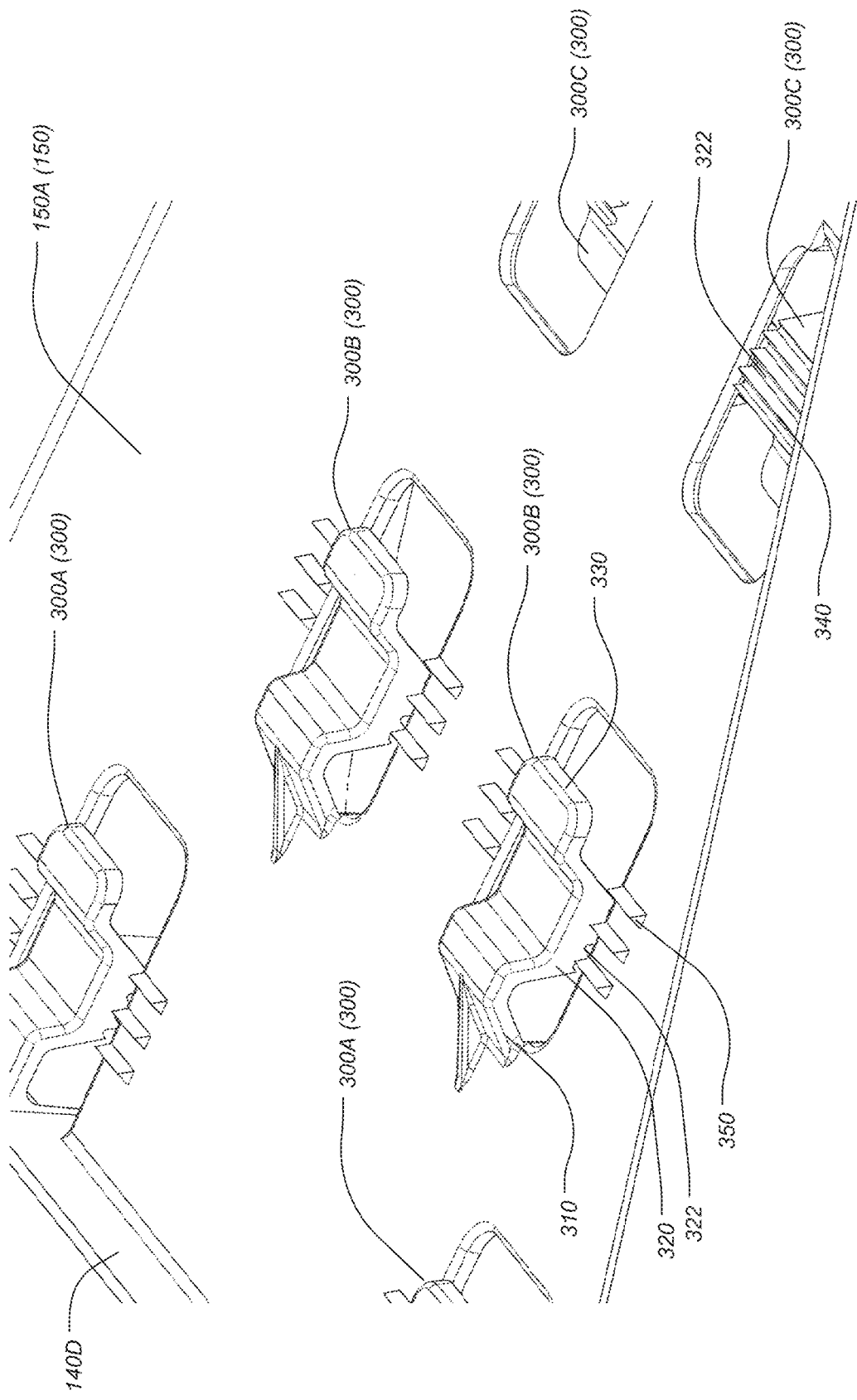
FIG. 5 shows a detailed view of examples of a plurality of clips in the utility box in FIG. 1.

FIG. 5 shows a detailed view of a plurality of clips 300 formed on the floor 150 of the utility box 10 in FIG. 1.

Referring to FIGS. 3 and 4, the first and third compartments 110A, 110C may be vertically adjoining to each other and laterally surrounded by the first, second and fourth sidewalls 140A, 140B, 140D and the divider wall 160. The first and third compartments 110A, 110C may be separated by the first floor 150A. Similarly, the second and fourth compartments 110B, 110D may be vertically adjoining to each other and separated by the second floor 150B, and may be laterally surround by the first, second and third sidewalls 140A, 140B, 140C and the divider wall 160.

All or some of the floors 150 may be angled. As seen in FIG. 3, the first and second floors 150A, 150B may be angled, for example, at an angle of about 25 degree to about 65 degree, with respect to a vertical center plane of the utility box 10 or the main body 100 (e.g., with respect to the plane of the wall 160). The first floor 150A may extend angled from an upper portion of the fourth sidewall 140D to a lower portion of the divider wall 160. The second floor 150B may extend angled from an upper portion of the divider wall 160 to a lower portion of the third sidewall 140C. The floor 150A may be formed such that the first and third compartments 110A, 110C may have the same storage capacity. Alternatively, a position and/or an angle of the floor 150A may be changed such that one of the first and third compartments 110A, 110C may have a larger storage capacity than the other. For example, the floor 150A may extend from the upper portion of the fourth sidewall 140D to a middle portion of the divider wall 160 to provide a larger storage capacity for the third compartment 110C.

Different floors 150 may be angled in different directions and at different angles. For example, the floors 150A, 150B may extend from the upper portions of the fourth and third sidewalls 140D, 140C, respectively, to the lower portion of the divider wall 160. Alternatively, the floors 150A, 150B may extend from the upper portion of the first or second sidewall 140A, 140B to the lower portion of the second or first sidewall 140B, 140A. Some of the floors 150 may not be angled at all.

Figure 6:
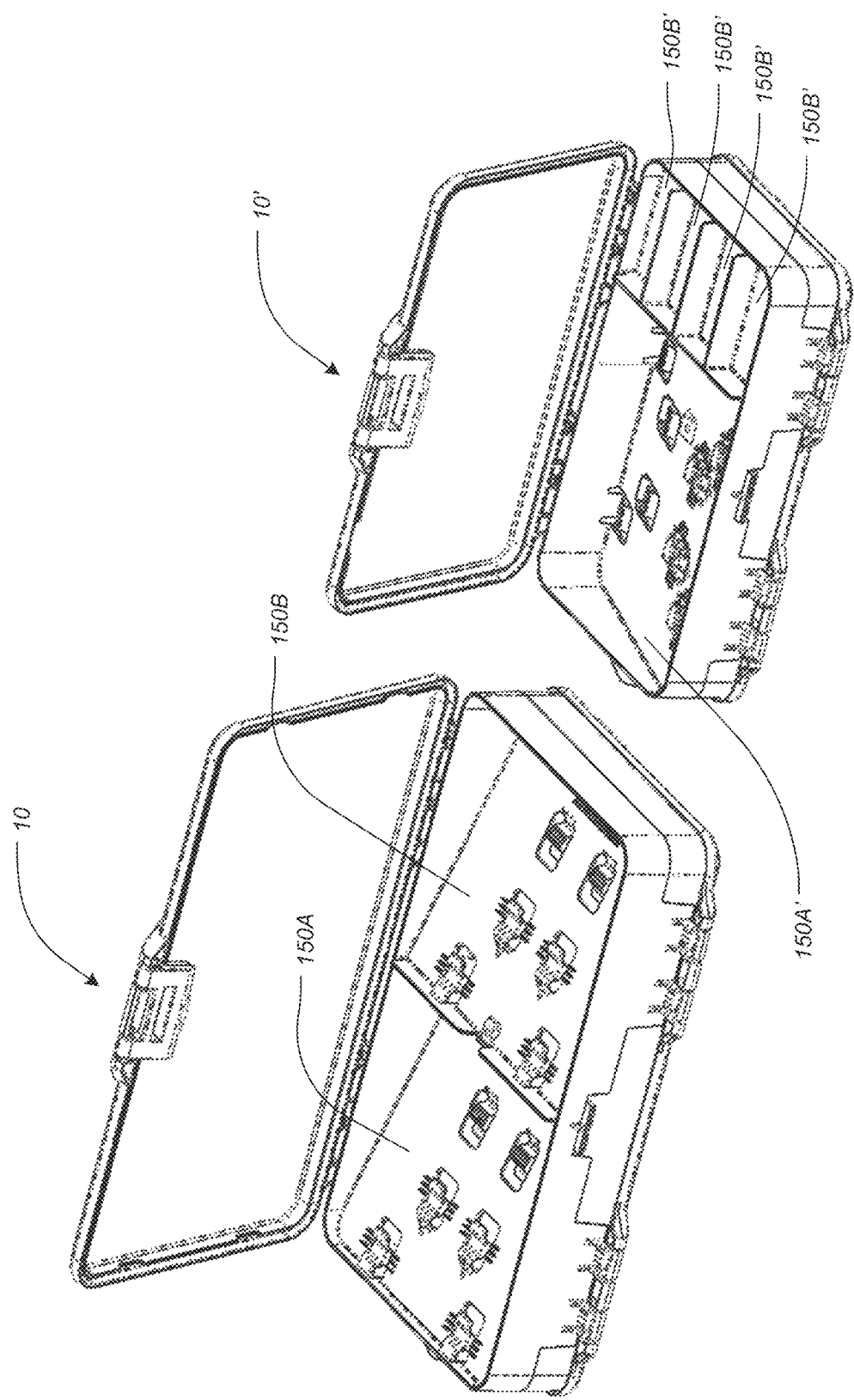
FIG. 6 shows another example of a utility box constructed according to the principles of the disclosure, which is placed next to the utility box in FIG. 1.

For example, FIG. 6 shows a utility box 10' constructed according to the principles of the disclosure, which is placed next to the utility box 10 in FIG. 1. The utility box 10' may have one large compartment with an angled floor 150A' and a plurality of smaller compartments that have a flat floor 150B'. The entire floor 150 may be angled, as seen in FIGS. 2 and 3. Alternatively, only a portion of the floor 150 may be angled.

Each compartment 110 may include one or more holding units 300. The holding unit 300 may include a clip, a hook, a clasp, a hook-and-loop fastener, a pin, a ring, a tie, and/or the like. For example, as seen in FIGS. 2-4, the holding units 300 may include a plurality of holding units 300A, 300B, 300C, 300D, which may be arranged on the floor 150. The holding units 300A, 300B, 300C, 300D may be arranged at different locations, such as, for example, the sidewalls 140, the divider wall 160, and/or the lid 200. The holding units 300 may be formed integrally with the floor 150 (and/or sidewall 140, divider wall 160, or lid 200), or formed separately and configured to be irremovably or removably attachable to the floor 150 (and/or sidewall 140, divider wall 160, or lid 200). In the latter case, the holding units 300 may be configured to be placeable at different locations on the floor 150 (and/or sidewall 140, divider wall 160, or lid 200), so as to provide optimal customization to securely and conveniently hold different sized and/or shaped articles in the holding units 300.

As seen in FIG. 4, the holding units 300A, 300B, 300C, 300D may be used to receive, engage and hold one or more articles 50, such as, for example, a bag, a packet, a package, or the like, that includes bait, lures, fishing hooks, or any other item that could benefit from storage in the utility box 10. For example, as seen in FIG. 4, the articles 50 may include first, second, third and fourth articles 50A, 50B, 50C, 50D, each of which may comprise a bag, packet, package, or the like, containing, for example, bait, tackle, or the like.

Referring to FIG. 4, the holding units 300A, 300B, 300C, 300D may be arranged on the first floor 150A. Since the first floor 150A may be shared by the first and third compartments 110A, 110C, some holding units 300 may be configured to hold some of the articles 50 in the first compartment 110A, and other holding units 300 may be configured to hold other articles 50 in the third compartment 110C. For example, as seen in FIG. 4, the first and second holding units 300A, 330B may be configured to hold the first and second articles 50A, 50B, respectively, in the first compartment 110A. The third and fourth holding units 300C, 300D may be configured to hold the third and fourth articles 50C, 50D, respectively, in the third compartment 110C. A holding unit 300 may hold more than one article 50. Two or more holding units 300 may be used to hold a single article 50.

Still referring to FIG. 4, since the first floor 150A is angled downwardly from the fourth sidewall 140D to the divider wall 160, the first storage space 110A may become gradually deeper as advancing from one end adjoining the fourth sidewall 140D to the other end adjoining the divider wall 160. The holding unit 300 for the first storage space 110A (e.g., first and second holding units 300A, 300B) may be arranged on a higher portion of the floor 150A closer to the fourth sidewall 140D to engage a thin portion (e.g., head portion) of the articles 50A, 50B in a shallow portion of the first storage space 110A adjoining the fourth sidewall 140D. This arrangement may allow a bulky portion (e.g., body portion containing bait or tackle) of the articles 50A, 50B to be placed in the deeper portion of the first storage space 110A and on a lower portion of the floor 150A closer to the divider wall 160. The bulky portions of the articles 50A, 50B may be stacked together in the deeper portion of the first storage space 110A.

The third storage space 110C may have substantially the same configuration but in an inverted manner, and the third and fourth articles 50C, 50D may be held by the third and fourth holding units 300C, 300D, respectively, and stacked together in the third storage space 110C, as seen in FIG. 4. Hence, due to the angled floor 150, the utility box 10 may store the articles 50 in a more efficient manner, and hence may be made smaller, lighter and more portable.

The holding units 300 may be manufactured independently and attached to the floor 150. Alternatively or additionally, the holding units 300 may be formed integral to the floor 150 by, for example, molding or the like. For example, FIG. 5 shows a plurality of holding units 300A, 300B, 300C formed integral to the floor 150A. The holding units 300 may have the identical or substantially the same structure. Alternatively, the holding units 300 may have different structures. The holding units 300 may be made of a memory material, such that it consistently defaults to and remains in a predetermined configuration, absent an external force being applied to the holding unit 300, such as, for example, a force applied by a human finger or the like.

Referring to FIG. 5, the holding unit 300 may include a floor interface member 310, an actuator body 320, an actuator tab 330, and/or the like. The floor interface member 310 may connected to the floor 150 and may have spring-like characteristics that apply a counter force when the holding unit 300 is lifted up or pushed down. The actuator body 320 may extend between the floor interface member 310 and the actuator tab 330. A middle portion of the actuator body 320 may be lowered to form an article contact surface 322, which may include one or more ribs or teeth 340. The floor 150 may also include one or more ribs or teeth 350 on portions adjacent to the article contact surface 322.

As described above, the floor interface member 310 may have the spring-like characteristics such that when a force is applied to lift up the actuator tab 330 (e.g., by a finger), forcing the actuator tab 330 to move away from the surface of the floor 150, the article contact surface 322 is caused to move away from the floor 150, thereby providing a space for the article 50 to be positioned between the article contact surface 322 and the floor 150. As the force that is applied to the actuator tab 330 is reduced, the actuator tab 330 may retract towards the floor 150 and the article contact surface 322 may move toward the floor 150, thereby engaging and holding the article 50 between the article contact surface 322 and the floor 150.

The article contact surface 322 may have any combination of a smooth contact surface or a roughened contact surface having, for example, the ribs 340 or the like. The ribs 340 of the article contact surface 322 may be constructed to bite into and securely hold the article 50 that is placed between the article contact surface 322 and the floor 150, which may also include the ribs 350 as seen in FIG. 5. Accordingly, the holding unit 300 may securely hold the article 50 within the compartment 150.

As described above, the main body 100 and/or the lids 200 may be formed of a transparent or translucent material such that the different compartments 100 may be seen without opening the lids 200. Also, the utility box 10 is provided with a plurality of compartments 110 and the user may use each compartment 110 for sorting and storing different articles 50. Furthermore, the compartments may have an angled floor 150, which may allow a user to store articles 50 more efficiently while providing better indexing options. Accordingly, the utility box 10 may allow for organization and retention of various articles in easy-to-inspect locations so that the user can quickly index through the articles stored therein and retrieve the desired article 50.

The terms "including," "comprising" and variations thereof, as used in this disclosure, mean "including, but not limited to," unless expressly specified otherwise.

The terms "a," "an," and "the," as used in this disclosure, mean "one or more," unless expressly specified otherwise.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device or article may be alternatively embodied by one or more other devices or articles which are not explicitly described as having such functionality or features.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A utility box having a main body formed by a wall structure that defines at least one compartment, the utility box comprising:
   a side wall in the wall structure;
   an angled floor integrally formed with the side wall;
   a compartment comprising the side wall, the angled floor integrally formed with the side wall and a holding unit configured to hold an article in the compartment;
   a hinge attached to the wall structure;
   a lid formed separately from the main body and arranged to pivotally connect to the hinge and cover the compartment; and
   wherein the holding unit is arranged on the angled floor.

2. The utility box of claim 1, wherein the holding unit is integral to the angled floor.

3. The utility box of claim 1, wherein the holding unit is arranged on a higher portion of the angled floor.

4. The utility box of claim 1, further comprising a second compartment located laterally adjacent to the said compartment.

5. The utility box of claim 4, wherein the second compartment comprises a second angled floor.

6. The utility box of claim 5, wherein said angled floor and the second angled floor are angled in the same direction.

7. The utility box of claim 5, wherein said angled floor and the second angled floor are angled in different directions.

8. The utility box of claim 5, wherein said lid covers both said compartment and the second compartment.

9. The utility box of claim 5, wherein the second compartment further comprises a second holding unit formed on the second angled floor.

10. A utility box having a main body formed by a wall structure that defines at least two compartments, the utility box comprising:
    a side wall in the wall structure of the main body;
    an angled floor integrally formed with the side wall;
    a first compartment comprising the side wall and angled floor and facing a first direction;
    a second compartment comprising the side wall and angled floor and located under the first compartment and facing a second direction;
    a first lid formed separately from the main body and attached to the wall structure; and
    a second lid formed separately from the main body and attached to the wall structure,
    wherein the angled floor is located between the first and second compartments
    wherein the first lid is arranged to pivot with respect to the main body to uncover the first compartment, and
    wherein the second lid is arranged to pivot with respect to the main body to uncover the second compartment.

11. The utility box of claim 10, further comprising:
    a holding unit configured to hold an article in the first compartment.

12. The utility box of claim 11, wherein the holding unit is arranged on the angled floor and formed integrally with the angled floor.

13. The utility box of claim 12, further comprising:
    another holding unit configured to hold another article in the second compartment,
    wherein said holding unit and said another holding unit are arranged on higher and lower portions of the angled floor, respectively.

14. A utility box having a main body formed by a wall structure that defines at least one storage compartment, the utility box comprising:
    a plurality of side walls in the sidewall structure of the main body;
    an angled floor surrounded by the sidewall structure of the main body and integrally formed with the sidewall structure;
    a storage compartment formed by the sidewall structure and angled floor;
    a holding unit configured to hold an article in the storage compartment;
    a hinge attached to the main body; and
    a lid formed separately from the main body and arranged to pivotally connect to the hinge and cover the storage compartment and holding unit,
    wherein the holding unit includes a moveable actuator body.

15. The utility box of claim 14, wherein the holding unit is arranged on the angled floor.

16. The utility box of claim 15, wherein the holding unit is arranged on an upper portion of the angled floor.

17. The utility box of claim 16, wherein the holding unit comprises a clip.

* * * * *

UNITED STATES PATENT AND TRADEMARK OFFICE
CERTIFICATE OF CORRECTION

PATENT NO. : 11,634,270 B2
APPLICATION NO. : 15/620334
DATED : April 25, 2023
INVENTOR(S) : John H. Whalen and Ryan J. Kleckner It is certified that error appears in the above-identified patent and that said Letters Patent is hereby corrected as shown below:

On the Title Page

Item (73), Assignee, delete "TX" and replace with -- IL --

In the Claims

In Column 8, Line 31, insert -- , -- after "compartments"

Signed and Sealed this
Twelfth Day of November, 2024

Katherine Kelly Vidal
*Director of the United States Patent and Trademark Office*